C. H. ROBERTS.
Gas Lighting Torches.
No. 136,006. Patented Feb. 18, 1873.
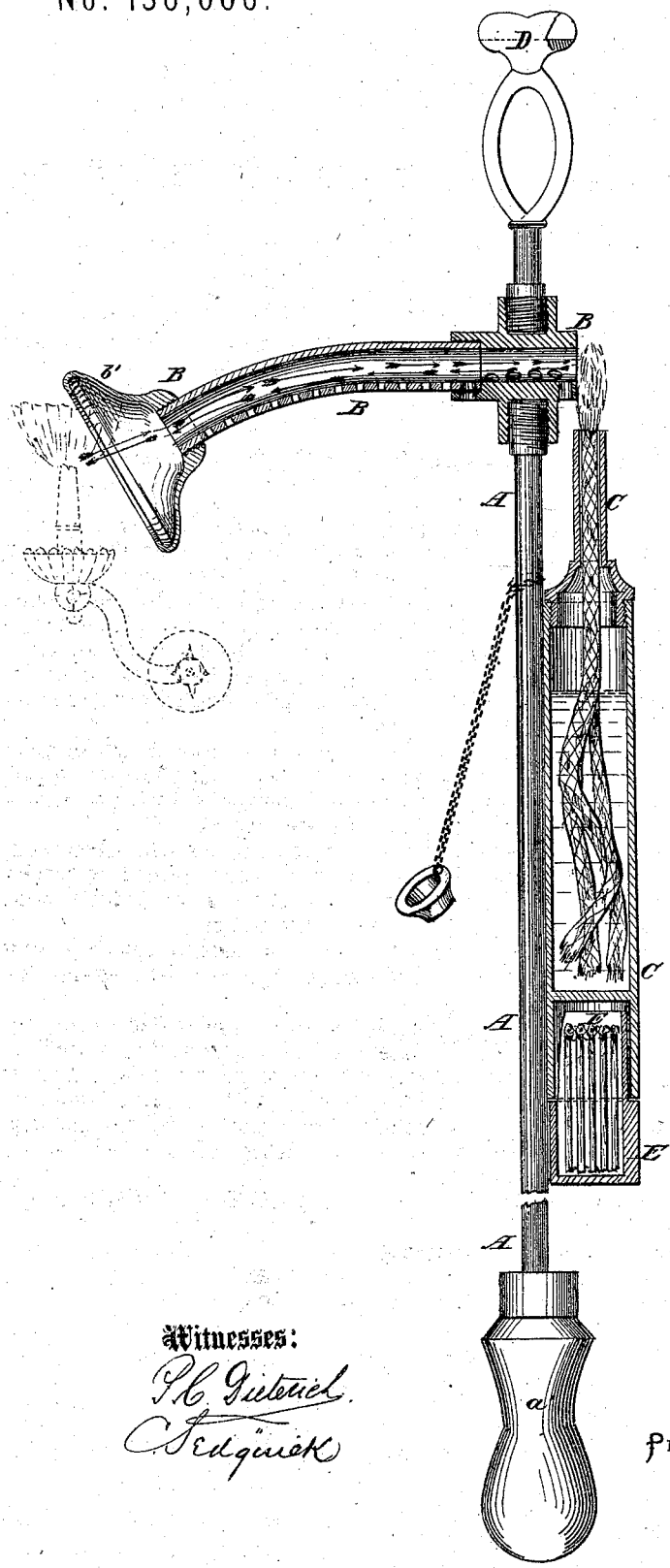

UNITED STATES PATENT OFFICE.

CHARLES H. ROBERTS, OF TROY, NEW YORK.

IMPROVEMENT IN GAS-LIGHTING TORCHES.

Specification forming part of Letters Patent No. 136,006, dated February 18, 1873.

*To all whom it may concern:*

Be it known that I, CHARLES H. ROBERTS, of Troy, in the county of Rensselaer and State of New York, have invented a new and useful Improvement in Gas-Lighting Torch, of which the following is a specification:

The figure is a side view of my improved gas-lighting torch partly in section to show the construction.

My invention is an improvement in gas-lighting torches; and consists of a tube provided with perforations and a cup-shaped end, and attached to a staff, so as to conduct a stream of gas from the burner to a lamp or taper also attached to said staff, as hereinafter described.

A is the staff of the torch, to the lower end of which is attached, or upon it is formed, a handle, $a'$. To the upper end of the staff A is secured a short pipe, B, which is curved downward, and its outer end is made flaring or cup-shaped, as shown in the figure. With the staff A is connected a lighting device, C, which may be a lamp, as shown in the figure, or a taper, as may be desired. The lamp or taper C is so arranged that its flame may be directly opposite the inner end of the pipe or tube B. With the inner end of the tube B, or with the upper end of the staff A, is connected a key, D, for turning the cock, to allow the gas to escape through the burner.

In using the torch, the outer or cup-shaped end of the tube B is passed over and into the globe, so as to be directly over the burner. The gas escaping from the burner thus enters and passes through the tube B, and escapes at the inner end of said tube B, where it comes in contact with the flame of the lamp or taper C, and is set on fire. The flame follows the stream of gas back through the tube B to the gas-burner.

In the lower side of the tube B are formed a number of small holes, $b^2$, to allow air to pass into said tube and mingle with the stream of gas to make it more inflammable.

E is a match safe or receptacle, which is inserted in a recess or cavity formed to receive it in the lower part of the lamp or taper-holder C, as shown in the figure.

Having thus described my invention, I claim as new and desire to secure by Letters Patent—

The perforated tube B provided with a cup-shaped outer end and attached to a staff, A, to conduct a stream of gas from the burner to be lighted to the flame of a lamp or taper, C, also attached to said staff A, substantially as herein shown and described, and for the purpose set forth.

CHARLES H. ROBERTS.

Witnesses:
W. W. WILLARD,
G. H. SAGENDORF.